United States Patent
Abhyankar

(10) Patent No.: US 12,474,964 B1
(45) Date of Patent: Nov. 18, 2025

(54) CENTRALIZED PARAMETER MANAGEMENT FOR AUTOMATIC EXECUTION OF PARAMETERIZED INSTRUCTIONS

(71) Applicant: Citibank, N.A., New York, NY (US)

(72) Inventor: Yogesh Abhyankar, Zurich (CH)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 19/204,472

(22) Filed: May 9, 2025

(51) Int. Cl.
*G06F 9/50* (2006.01)
*G06F 9/54* (2006.01)

(52) U.S. Cl.
CPC ............ *G06F 9/5033* (2013.01); *G06F 9/543* (2013.01); *G06F 2209/503* (2013.01); *G06F 2209/545* (2013.01)

(58) Field of Classification Search
CPC .. G06F 9/5033; G06F 9/543; G06F 2209/503; G06F 2209/545
See application file for complete search history.

(56) References Cited

U.S. PATENT DOCUMENTS

| | | | |
|---|---|---|---|
| 2009/0292987 A1* | 11/2009 | Sorenson | G06F 40/103 715/255 |
| 2020/0184556 A1* | 6/2020 | Cella | G06Q 30/0206 |
| 2023/0214925 A1* | 7/2023 | Cella | G06Q 30/06 705/37 |

* cited by examiner

*Primary Examiner* — Kevin L Young
*Assistant Examiner* — Kimberly L Jordan
(74) *Attorney, Agent, or Firm* — Perkins Coie LLP

(57) ABSTRACT

Systems and methods are disclosed for centralized management and application of distributed parameters through a data generation platform. The platform obtains an aggregate rule set including zone-specific parameter sets and zone classifiers for multiple zones, where the rule set determines allocation metric values associated with transaction values of resources. Upon receiving input data including entity identifiers, resource identifiers, and transaction data, the platform maps the data to zones by comparing zone classifiers, filters the aggregate rule set to generate a zone-specific rule subset, and applies the subset to generate allocation metric values. The platform can process requests synchronously through online message queues and/or asynchronously for bulk processing. Machine learning models can use distribution patterns across multiple resource sets to generate overall allocation metrics and modification suggestions. The platform can provide a graphical user interface for displaying allocation metrics, resource information, and/or supplemental explanations.

20 Claims, 8 Drawing Sheets

CENTRALIZED PARAMETER MANAGEMENT FOR AUTOMATIC EXECUTION OF PARAMETERIZED INSTRUCTIONS

BACKGROUND

Distributed parameterized instructions (e.g., rules) refer to a system architecture where components and processing can be spread across multiple interconnected systems. In traditional distributed setups, individual components can operate independently while communicating and coordinating with each other to enable applying multiple parameterized instructions to a single input. Components within the distributed framework can exchange information through different interface types, such as direct application programming interface (API) connections, message queue channels, batch mode processing, and so forth to enable data transfer between the components. However, when parameters need to be modified in such distributed environments, changes must be replicated across multiple systems, which can be time-consuming and prone to synchronization errors.

DETAILED DESCRIPTION

Figure 1:
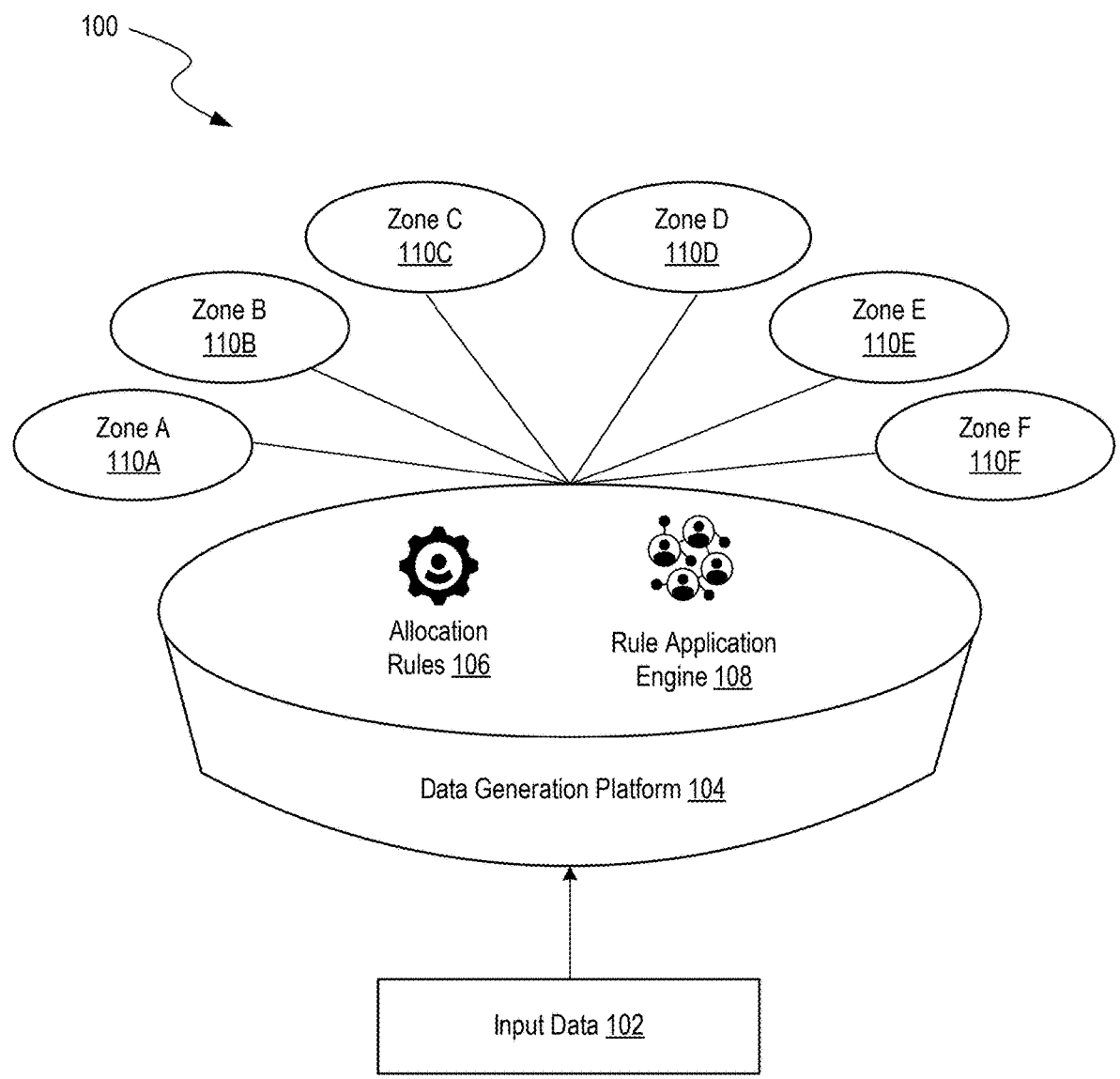
FIG. 1 illustrates an example environment of distributed systems used by a data generation platform for automatically applying the distributed parameters of the distributed systems to input data.

Distributed parameterized instructions can include, for example, computational workflows (e.g., modeled around tax calculation rules), allocation metrics, and processing parameters that are spread across multiple interconnected systems. These instructions enable individual components to operate independently while communicating through various interfaces such as API connections to coordinate the application of multiple parameters to a single input. The instructions can include zone-specific parameter sets with associated classifiers that determine allocation metric values, transaction processing rules, and/or validation requirements to be coordinated across distributed system components. Zone-specific parameter sets can be groups of rules or instructions that apply to particular operational zones or jurisdictions—for example, tax rules specific to different countries or regions—while zone classifiers can be identifiers that determine which set of parameters should apply to a given transaction or resource based on its characteristics.

Conventionally, multiple external processors are used to communicate directly with organizational/internal system processors since each external processor includes their own respective processing capabilities (e.g., specific distributed parameterized instructions, zone-specific parameter sets, and so forth). Each external processor (e.g., processors for each product managed by an organizational system) maintains separate parameterized instructions and processing components. This distributed architecture requires the parameterized instructions to be maintained across multiple fragmented systems, where changes to parameters are to be replicated across each system. When parameters are modified in such distributed environments, changes are to be replicated across multiple systems, which can be time-consuming and prone to synchronization errors.

This fragmented approach means that even though the platform is generating data based on the same product (or another classifier), each jurisdiction may handle the generation differently, which conventional methods may not determine until the system processor communicates with each external system individually, wasting system resources such as central processing units (CPUs), network resources, and the like. For example, when processing tax withholding rules across multiple jurisdictions, each product processor independently communicates with its respective system processor to determine the applicable parameters, requiring redundant computations and data transfers. This inefficient approach leads to increased processing overhead as the system maintains separate connections and processing threads for each jurisdiction-specific calculation, even when applying similar rules to the same product type. Additionally, the distributed nature of these communications creates unnecessary network traffic and memory utilization, as identical reference data and processing logic are replicated across multiple system processors rather than being centrally managed and efficiently distributed.

Attempting to create a system to manage distributed parameterized instructions across multiple zones created significant technological uncertainty. Creating such a system required addressing several unknowns in conventional approaches to applying distributed parameterized instructions, such as how to efficiently integrate parameters across different jurisdictions. Traditional distributed systems, while capable of processing parameters independently, often execute calculations based on fragmented rule sets and oftentimes iterate through redundant rule sets that are inapplicable.

For example, the parameter requirements can differ based on factors such as the jurisdiction's specific rules, the context in which the transaction occurs, the particular processing needs implied by the resource type, and so forth. However, managing parameterized instructions across multiple zones created technological uncertainty due to the inherent complexity of distributed systems. Different zones often implement their parameters in various formats, store data in different data structures, and so forth. Additionally, integrating zone-specific parameters into the processing created technological uncertainty due to conventional approaches that did not allow for dynamically adjusting calculations based on zone requirements. Furthermore, generating allocation metrics using zone-based parameters created further technological uncertainty due to multi-jurisdictional transactions that included multiple parameter sets.

To overcome the technological uncertainties, the inventors evaluated multiple design alternatives. For example, the inventors tested various processing techniques to generate accurate allocation metrics. One alternative tested included distributed processing methods, where each system processor independently handled parameter calculations for its jurisdiction. However, this approach often led to redundant processing, with many calculations being duplicated across systems due to the lack of centralized management. Another design alternative was to evaluate isolated parameter sets that relied on predefined rules for each jurisdiction. However, isolated systems were limited by their inability to coordinate across zones and were especially ineffective in cases where multiple systems were used to calculate the allocation metrics. The inventors also evaluated basic parameter replication models to maintain consistency across systems. Although the models reduced discrepancies, they still struggled with synchronizing parameter updates across distributed systems, leading to potential calculation errors.

As such, the inventors have developed a system for centrally managing distributed parameters (hereinafter the "data generation platform"). The data generation platform receives input data from one or more computing devices, including entity identifiers, resource identifiers, and/or transaction data indicative of transaction values. A model (e.g., machine learning model, AI model) obtains an aggregate rule set comprising zone-specific parameter sets and respective zone classifiers for multiple zones. The model maps (e.g., associates, links) the input data to zones by comparing the particular zone classifier for each resource with the respective zone classifier for each zone-specific parameter set. For each resource, allocation metric values can be determined based on the mapped zones and filtered rule subset. An AI model of the platform (same or different than the model discussed above) can generate allocation metrics and/or identify distribution patterns across multiple resource sets to determine overall allocation values. In some implementations, the classification can be performed at the zone level, allowing each resource to inherit parameters from the zone it is mapped to. For instance, if a zone is classified with specific allocation rules, all resources mapped to that zone can inherit those parameters.

Unlike conventional approaches that rely on fragmented system processor communications, the disclosed systems and methods can dynamically integrate multiple zone-specific parameter sets. For example, in response to input data containing multiple resources, the data generation platform executes distributed parameterized instructions based on specific zone requirements through a single input communication. The data generation platform can filter out irrelevant parameters by first mapping resources to appropriate zones, then generating a zone-specific rule subset. Additionally, the data generation platform mitigates the issue of fragmented processing, where the same parameter calculations can occur redundantly across different jurisdictions, since the parameters are filtered. The data generation platform can further maintain the flexibility of processing parameters according to specific operational needs (e.g., real-time calculations, bulk processing) while preserving consistent rule application across zones.

While the current description provides examples of the rule application engine related to LLMs, one of skill in the art would understand that the disclosed techniques can apply to other forms of machine learning or algorithms, including unsupervised, semi-supervised, supervised, and reinforcement learning techniques. For example, the disclosed data generation platform can apply allocation rules using support vector machine (SVM), k-nearest neighbor (KNN), decision-making, linear regression, random forest, naïve Bayes, or logistic regression algorithms, gradient boosting, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of the Data Generation Platform

FIG. 1 illustrates an example environment 100 of distributed systems used by a data generation platform 104 for automatically applying the distributed parameters of the distributed systems to input data. The example environment 100 includes input data 102, the data generation platform 104, allocation rules 106, the rule application engine 108, and zones 110. The data generation platform 104 can be implemented using components of example devices 600 and client computing devices 702 illustrated and described in more detail with reference to FIG. 6 and FIG. 7, respectively. Implementations of example environment 100 can include different and/or additional components or can be connected in different ways.

The input data 102 can refer to the raw or normalized data that is fed into the data generation platform 104. The input data 102 can originate from various sources, such as user inputs, sensors, databases, or external APIs. In some implementations, input data 102 can include structured data such as spreadsheets or databases, unstructured data such as text documents or images, and/or semi-structured data such as JSON or XML files. For instance, in the context of tax calculations, input data 102 can include transaction details, client information, and/or financial product specifications.

The data generation platform 104 can be implemented using a combination of hardware and software components, including servers, databases, machine learning models, and so forth. In some embodiments, the data generation platform 104 can use cloud-based resources to scale its processing capabilities dynamically. The data generation platform 104 dynamically filters and applies the allocation rules 106 to the input data 102. For example, in the context of tax calculations, the data generation platform 104 can apply relevant tax rules to determine the appropriate tax amounts depending on a particular jurisdiction specified in the input data 102.

The allocation rules 106 can refer to predefined criteria or instructions that define how the input data 102 is transformed by the data generation platform 104. The allocation rules 106 can be based on, for example, data type, source, and/or intended use. In some embodiments, allocation rules 106 can be dynamically updated based on real-time/near real-time data and/or manual user inputs. For instance, in the context of tax calculations, the allocation rules 106 can specify the tax rates and conditions for different types of transactions and jurisdictions.

The rule application engine 108 is a component within the data generation platform 104 that applies the allocation rules 106 to the input data 102. The rule application engine 108 transforms the input data 102 according to the specified criteria of the allocation rules 106. The rule application engine 108 can be implemented using rule-based systems, machine learning models, and so forth. In some embodiments, the engine can operate in real time or near real time, applying the allocation rules 106 as the input data 102 is received, or in batch mode, processing a particular volume of data at scheduled intervals. For example, the rule application engine 108 can calculate tax amounts in real time for individual transactions or process bulk transactions in batch mode.

Zones 110 can refer to areas or categories within the data generation platform 104 where specific rules and parameters are applied. Each zone can be associated with a particular type of data or processing requirement. For example, one zone can be directed to financial data. In some embodiments, zones 110 can be dynamically created or modified based on the input data 102. For instance, different zones can correspond to different tax jurisdictions, each with its own set of tax rules and rates.

Figure 2A:
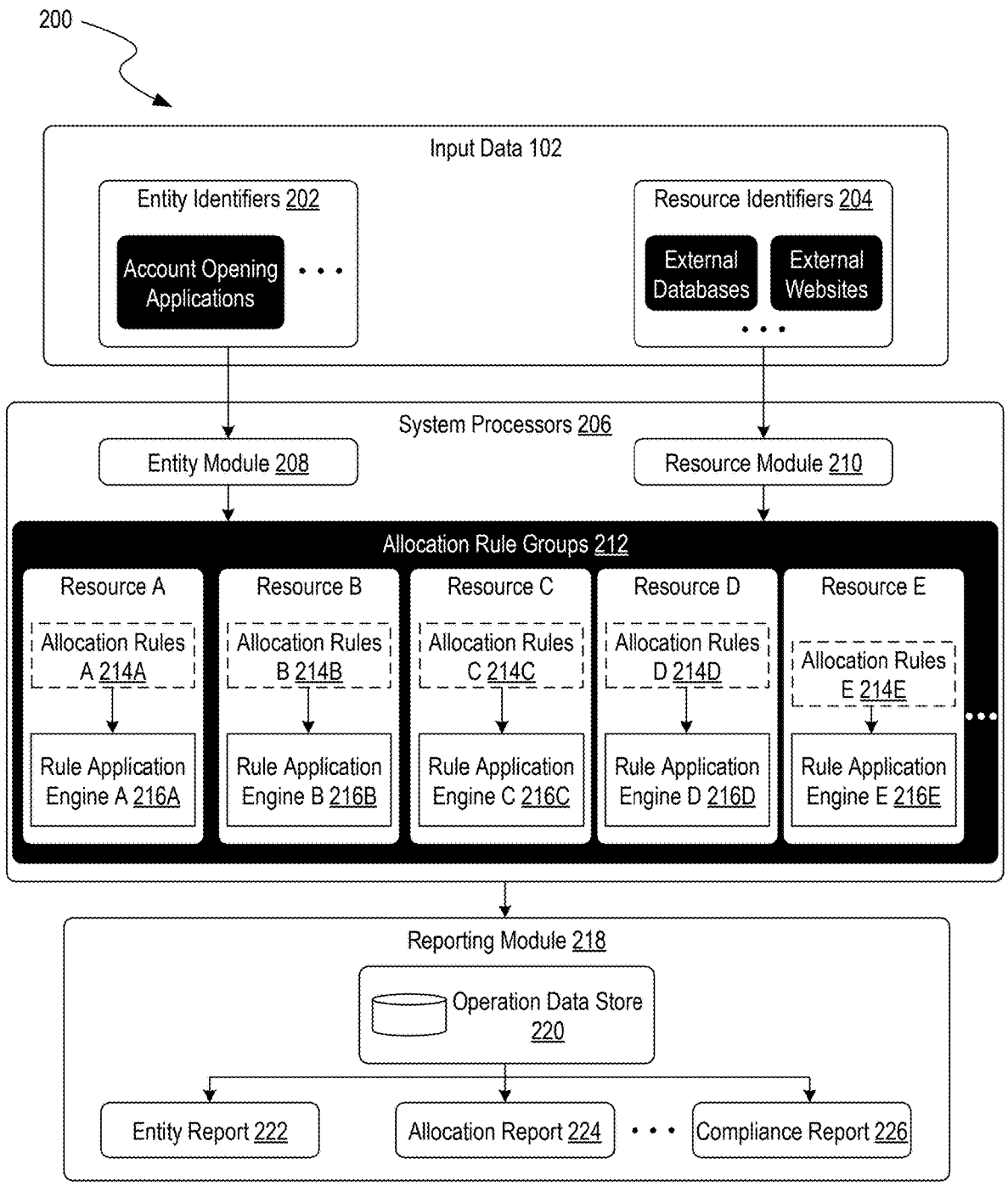
FIG. 2A illustrates applying distributed parameters to the input data of FIG. 1 by individually retrieving the distributed parameters of distributed systems according to some implementations of the present technology.

FIG. 2A illustrates applying distributed parameters to the input data (for example, that of FIG. 1) by individually retrieving the distributed parameters of the distributed systems of FIG. 1. FIG. 2A includes the input data 102 from FIG. 1, entity identifiers 202, resource identifiers 204, system processors 206, and a reporting module 218. The system processors 206 can include an entity module 208, a resource module 210, and allocation rule groups 212 (which can include allocation rules 214 and rule application engines 216). The reporting module 218 can include an operation data store 220 and reports such as an entity report 222, an allocation report 224, a compliance report 226, and so forth. The system processors 206 and the reporting module 218 can be implemented using components of example devices 600 and client computing devices 702 illustrated and described in more detail with reference to FIG. 6 and FIG. 7, respectively. Implementations of FIG. 2A can include different and/or additional components or can be connected in different ways.

The entity identifiers 202 can refer to unique identifiers assigned to entities within the system. The entity identifiers 202 can be used to distinguish between different entities, such as clients, organizations, institutions, and so forth. The entity identifiers 202 can be used to identify rules (e.g., rules within the allocation rules 106 in FIG. 1) that relate to specific entities. In some embodiments, the entity identifiers 202 can include alphanumeric codes, unique IDs, hashes, or other forms of identification. For example, the entity identifiers 202 can be used to identify different clients or organizations for which tax calculations are being performed. The entity identifiers 202 can be linked (e.g., associated, mapped, in communication) to account opening applications, which provide information about the entity, including its financial status, tax obligations, and so forth. This linkage enables the data generation platform 104 to obtain up-to-date information about each entity.

Similarly, the resource identifiers 204 can refer to unique identifiers assigned to resources (e.g., financial products, assets, or other items used by the data generation platform 104). The resource identifiers 204 can be alphanumeric codes, unique IDs, hashes, or other forms of identification. For instance, the resource identifiers 204 can be used to identify different financial products or assets that are subject to tax calculations. The resource identifiers 204 can be linked (e.g., associated, mapped, in communication) to data sources such as Swiss Infrastructure and Exchange (SIX) and Bloomberg, which provide market data associated with the resources. This linkage enables the data generation platform 104 to obtain accurate data associated with the resources.

The system processors 206 can refer to computational components used to process the input data 102. The system processors 206 execute computer-executable instructions that include algorithms and/or rules to transform and/or evaluate the input data 102. The entity module 208 within the system processors 206 can ingest input data 102 related to entities, such as clients or organizations, while the resource module 210 can ingest input data 102 related to resources, such as financial products or assets. The allocation rule groups 212 (e.g., zones 110) can include allocation rules 214 (e.g., the allocation rules 106 in FIG. 1) and/or rule application engines 216, which apply a subset of the allocation rules 214 to the data. For example, the system processors 206 can calculate tax amounts based on predefined jurisdictional rules for different entities and resources (e.g., resource A, resource B, resource C, resource D, resource E) across different operational contexts such as jurisdictions or financial products (e.g., cash, deposits, equities, funds, alternative investments, and so forth).

The reporting module 218 can generate and/or manage reports based on the applied allocation rules 214. The reporting module 218 can include the operation data store 220, which stores the generated reports. The reporting module 218 can generate various types of reports, such as an entity report 222, an allocation report 224, a compliance report 226, and so forth. For instance, the reporting module 218 can generate reports that summarize tax calculations for different entities and resources, include auditing information used for compliance with regulations, and/or provide explanations of the tax processing workflow used.

In FIG. 2A, the data generation platform 104 relies on a separate rule application engine 216 for each allocation rule group within allocation rule groups 212 since each allocation rule group is associated with a different group of allocation rules 214. Thus, the presence of multiple rule application engines 216 means that each engine independently retrieves, processes, and applies its respective allocation rules 214 to the input data 102. This redundancy not only consumes significant computational resources (e.g., increased CPU usage), but also increases the likelihood of errors due to the complexity of managing multiple engines and rule sets.

Figure 2B:
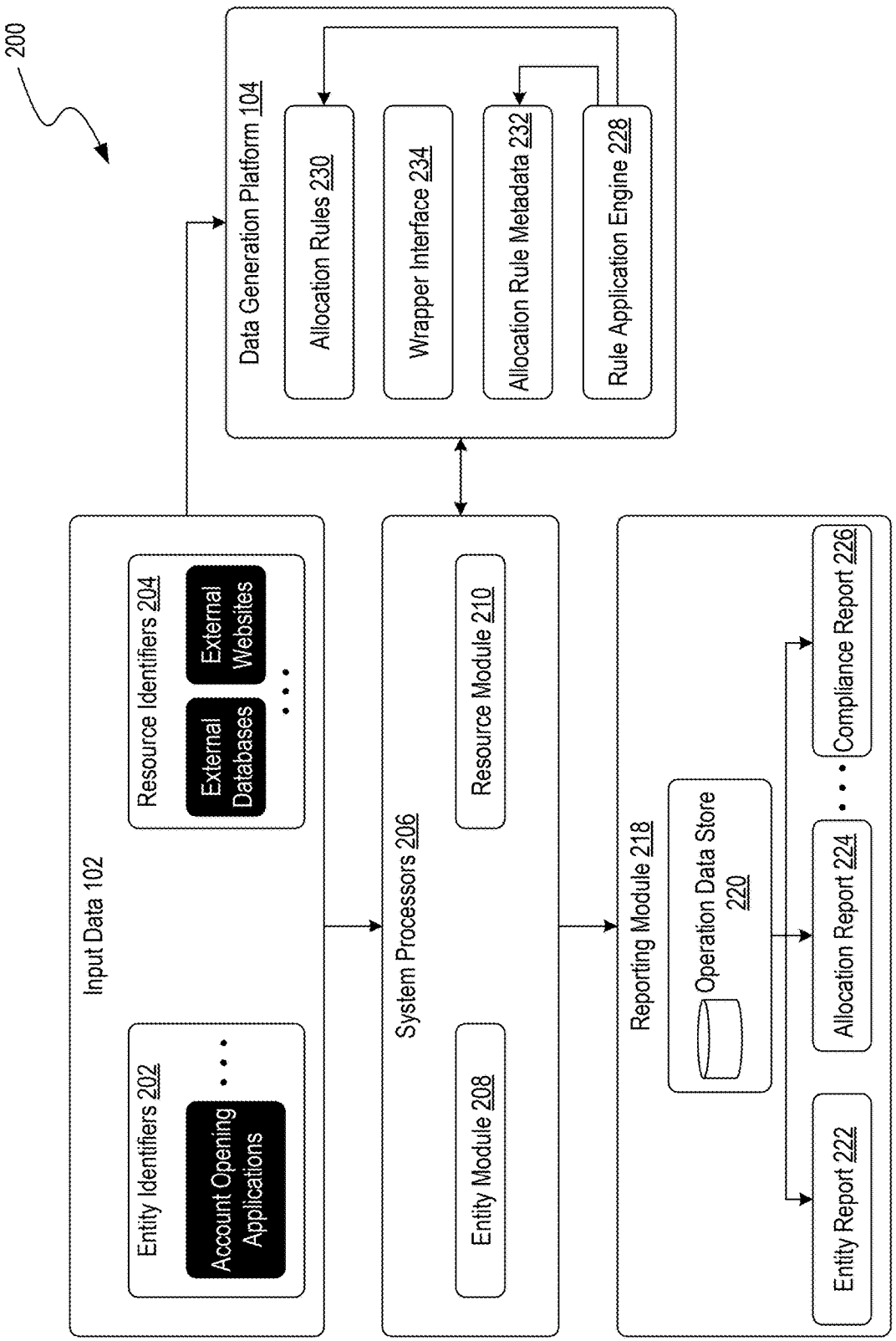
FIG. 2B illustrates applying distributed parameters to input data using a data generation platform according to some implementations of the present technology.

In contrast, FIG. 2B illustrates applying distributed parameters to the input data of FIG. 1 using the data generation platform 104 of FIG. 1. FIG. 2B includes the data generation platform 104, which can include a rule application engine 228, allocation rules 230, allocation rule metadata 232, and a wrapper interface 234. The rule application engine 228 and wrapper interface 234 can be implemented using components of example devices 600 and client computing devices 702 illustrated and described in more detail with reference to FIG. 6 and FIG. 7, respectively. Implementations of FIG. 2B can include different and/or additional components or can be connected in different ways.

The data generation platform 104 consolidates the rule application process into a single rule application engine 228. The centralization significantly reduces the CPU load on the system processors 206, as there is no longer a need to manage multiple independent rule application engines. The rule application engine 228 within the data generation platform 104 applies all allocation rules 230, which are centrally stored and managed. Further, the data generation platform 104 is enabled to apply the rules consistently across all input data 102.

The allocation rules 230 (e.g., allocation rules 106, allocation rules 214) in the data generation platform 104 are stored in a centralized repository, making it less cumbersome to update and maintain them. The allocation rule metadata 232 can provide additional context and information about the rules, such as their version history, dependencies, applicable conditions, and so forth. The wrapper interface 234 can refer to an intermediary layer facilitating communication between the data generation platform 104 and other system components (e.g., a user interface). The wrapper interface 234 can route the input data 102 to the rule application engine 228 and/or transmit the output of the rule application engine 228 to the reporting module 218.

Figure 3:
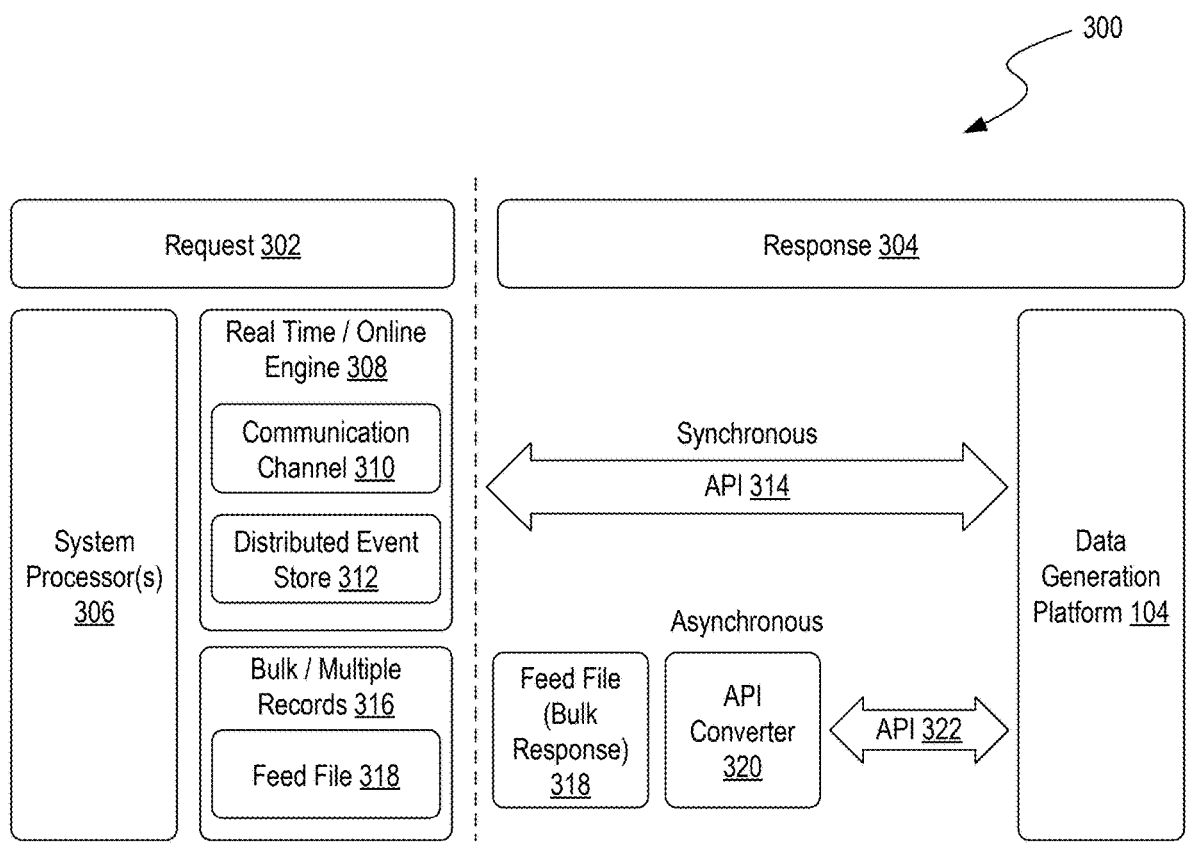
FIG. 3 illustrates an example environment of a data generation platform processing input data through synchronous and asynchronous communication channels according to some implementations of the present technology.

FIG. 3 illustrates an example environment 300 of the data generation platform 104 of FIG. 1 processing the input data of FIG. 1 through synchronous and asynchronous communication channels. The example environment 300 includes a request 302, a response 304, system processors 306, an online engine 308, a first API 314, a bulk engine 316, a feed file 318, an API converter 320, and a second API 322. The online engine 308 can include a communication channel 310 and/or a distributed event store 312. The bulk record engine 316 can include a feed file 318. The system processors 306, online engine 308, and/or bulk engine 316 can be implemented using components of example devices 600 and client computing devices 702 illustrated and described in more detail with reference to FIG. 6 and FIG. 7, respectively. Implementations of example environment 300 can include different and/or additional components or can be connected in different ways.

The request 302 can refer to the initial input or query (e.g., input 102 in FIGS. 1-2B) obtained by the data generation platform 104. The request 302 can originate from various sources, such as user inputs, automated systems, or external APIs. On the other hand, the response 304 can refer to the output generated by the rule application engine 228 after processing the request 302. The response 304 can include, for example, calculated tax amounts, reports, and so forth.

The system processors 306 (e.g., the system processors 206 in FIG. 2A and FIG. 2B) can enable the execution of algorithms, application of rules, and transformation of input data 102 into the output within response 304. The system processors 306 can operate in synchronous and/or asynchronous modes and can switch between the two modes depending on the nature of the request 302 and/or the processing requirements. For example, the synchronous communication channels, managed by the online engine 308, can be used for real-time or near real-time processing (e.g., for time-sensitive tasks). The asynchronous communication channels, managed by the bulk engine 316, can be used for processing volumes of data at a scheduled interval.

The online engine 308 can process requests 302 and generate responses 304 in real time or near real time. The online engine 308 can include a communication channel 310 to facilitate the exchange of data between the system processors 306 and the rule application engine 228. In some implementations, the online engine 308 can include a distributed event store 312 to store events and/or data related to the processing tasks. The distributed event store 312 ensures that the online engine 308 can track and manage the processing activities. The first API 314 can refer to an interface that allows external systems (e.g., the rule application engine 228) to interact with the online engine 308. For example, the rule application engine 228 receives requests 302 and sends responses 304.

On the other hand, the bulk engine 316 can refer to a component of the data generation platform 104 that facilitates batch processing of input data 102. The bulk engine 316 includes a feed file 318, which stores the input data 102 for batch processing. The API converter 320 facilitates the conversion of data between different API formats and between the online engine 308, bulk engine 316, and other external systems. The API converter 320 can ensure that data is correctly formatted and compatible with the different APIs used within the system. The second API 322 can be an interface that allows external systems to interact with the bulk engine 316 and provide a standardized way for external systems to send bulk requests and receive bulk responses.

Figure 4:
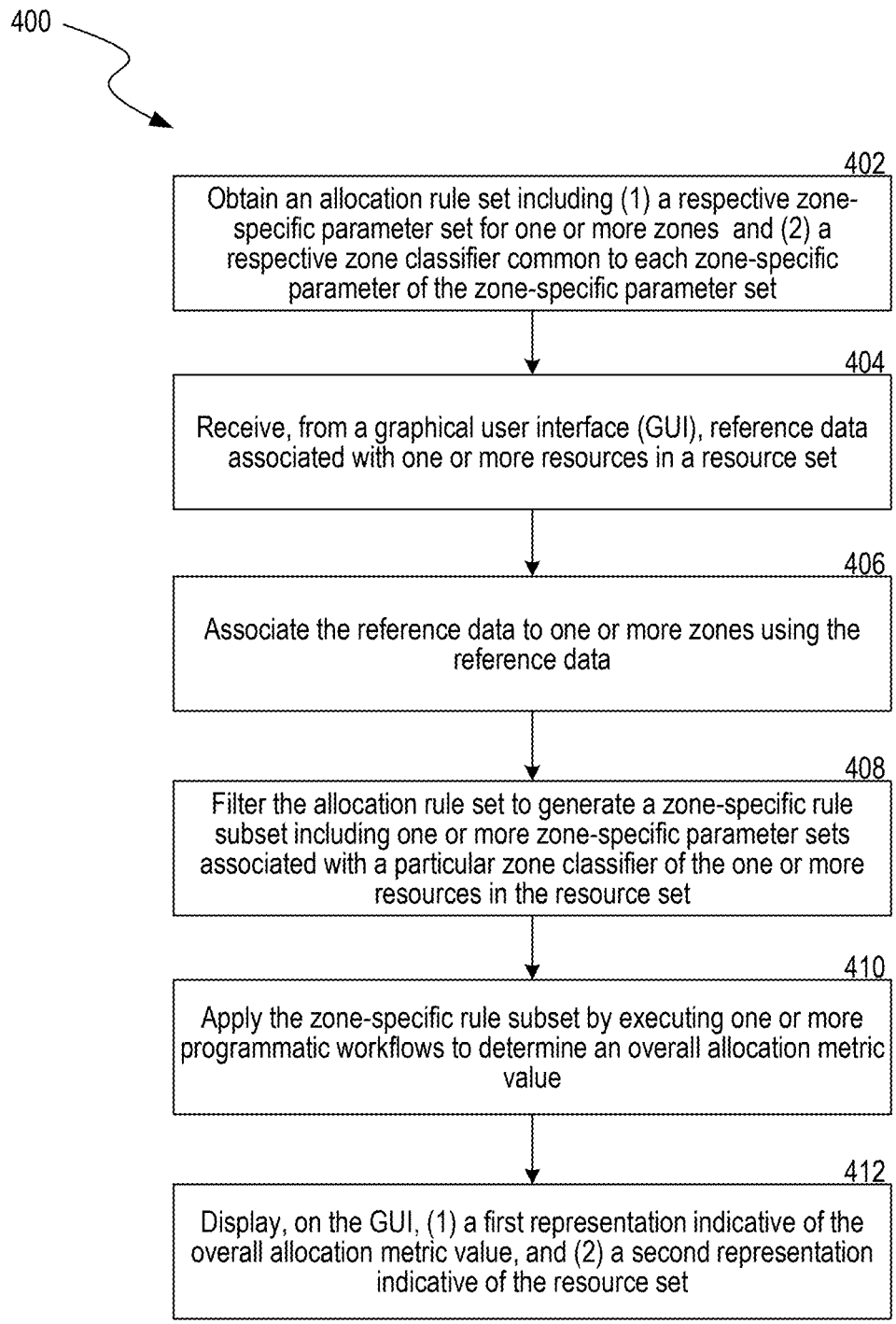
FIG. 4 is a flow diagram illustrating an example process of applying distributed parameters to an input resource using a data generation platform according to some implementations of the present technology.

FIG. 4 is a flow diagram illustrating an example process 400 of applying distributed parameters to an input resource using the data generation platform 104 of FIG. 1. In some implementations, the example process 400 is performed by a system including components of the example environment 100 illustrated and described in more detail with reference to FIG. 1. The system can be implemented on a terminal device, on a server, or on a telecommunications network core. Implementations can include different and/or additional operations or can perform the operations in different orders.

In operation 402, the data generation platform 104 can obtain an aggregate allocation rule set including a respective zone-specific parameter set (e.g., tax rules, allocation rules, and so forth) for one or more zones (e.g., jurisdiction, regime, and so forth) of multiple zones and a respective zone classifier common to each zone-specific parameter of the respective zone-specific parameter set. The aggregate rule set can be used to determine, for each zone of the multiple zones, an allocation metric value (e.g., withholding amount) associated with a transaction value of one or more resources.

The zone-specific parameter sets can be, for example, tax rates, exemptions, deductions, allocation rules, and other regulatory requirements from content sources such as government publications, legal documents, industry standards, regulatory databases, and so forth. The content sources can include unstructured data and/or structured data, such as documents, audio, video, images, and so forth. In some implementations, the data generation platform 104 can use web scraping tools and/or APIs to automatically collect data from online sources such as government websites, financial databases, and regulatory bodies. The data generation platform 104 can be instructed to periodically check for updates and changes in the regulations so that the parameter sets remain current.

For structured data, such as databases and spreadsheets, the data generation platform 104 can directly extract the fields and corresponding values. For unstructured text-based data, such as text documents and PDFs, the text can be broken into smaller units, such as words or sentences. Named Entity Recognition (NER) algorithms can be applied to identify and categorize key entities such as names, dates, and monetary values by scanning the text and using predefined patterns and machine learning models to recognize and classify entities. For example, if the text contains financial data, the data generation platform 104 can identify and extract figures, dates, and/or transaction details. Optical Character Recognition (OCR) can be used to detect and extract any text present in images by converting shapes within the image into machine-readable text. Convolutional neural networks (CNNs) can be used to identify and classify objects, scenes, or specific features within the image by passing the image through multiple layers of filters that detect different features, such as edges, textures, and shapes. These features are then combined to recognize and classify objects within the image. For example, if the image contains a document, the data generation platform 104 can extract the text and any relevant fields such as names, dates, and signatures. Videos and audio can be converted to text similarly by first converting the video and/or audio to text.

In some implementations, the data generation platform 104 can validate the extracted data to ensure its accuracy and relevance by cross-referencing the data against one or more content sources and checking for discrepancies. Inconsistencies can be flagged for manual review and/or remediated using predefined rules (e.g., the newest version is used). The data generation platform 104 can structure the data by defining a schema for the zone-specific parameter sets. The schema can include fields for each parameter, such as tax rates, exemptions, deductions, allocation rules, and so forth, with each field assigned a specific data type. The normalized and validated data can be organized according to the defined schema.

In operation 404, the data generation platform 104 can receive, from a graphical user interface (GUI), input/reference data including an entity identifier (e.g., a client identification number), a resource identifier representing each resource (e.g., an asset, a financial product, and so forth) in a resource set, and/or transaction data (e.g., transaction details) indicative of a corresponding transaction value for each resource in the resource set. The input data can be indicative of a particular zone classifier for each resource in the resource set. Each identifier can be linked to a respective entity/resource, and the link can be predefined or input via the GUI using dropdown menus, search functions, direct input fields, and so forth.

The data generation platform 104 can receive a raw reference data set comprising market data associated with the resource set. The data generation platform 104 can convert the raw reference data set into a standardized reference data set sharing a common format. The data generation platform 104 can normalize non-standardized raw data by converting different units of measurement and/or naming conventions to a common standard. The data generation platform 104 can enrich the data by integrating additional information from other sources or calculating derived metrics to map the raw data to a standardized schema (i.e., structured data).

In operation 406, responsive to receiving the input data, the data generation platform 104 can associate (e.g., map) the received input data to one or more zones of the multiple zones by comparing the particular zone classifier for each resource (e.g., the jurisdiction/regime of the financial product) in the resource set with the respective zone classifier for each zone-specific parameter set (e.g., the jurisdiction/regime of the aggregated tax rules) of the aggregate rule set. For instance, if the input data is classified under a specific jurisdiction, the data generation platform 104 can compare this classifier with the respective zone classifier for each zone-specific parameter set to find a match. In some implementations, the input data includes multiple zone classifiers and/or is mapped to multiple zones. For example, a resource that is governed by both national and international regulations uses multiple zone classifiers to capture all relevant regulatory contexts. The respective zone classifiers for each zone-specific parameter set can be stored in a tree-shaped data structure, a knowledge graph, a vector database, and so forth. If a resource has multiple zone classifiers, the data generation platform 104 can create a list of matched zones for each resource based on the comparison.

In operation 408, using the mapped one or more zones, the data generation platform 104 can filter the aggregate allocation rule set to generate a zone-specific rule subset (e.g., rules in the aggregate rule set that match those that are supposed to be applied) including one or more zone-specific parameter sets associated with the particular zone classifier. The data generation platform 104 uses the mapped zones as filtering criteria to extract the relevant parameter sets by comparing the zone classifiers of the mapped zones with the classifiers in the aggregate rule set. The data generation platform 104 selects the parameter sets that match the filtering criteria, creating a zone-specific rule subset that includes only the rules and regulations applicable to the identified zones. For example, if a resource is mapped to a specific jurisdiction, the data generation platform 104 filters the aggregate rule set to include only the rules and regulations associated with that jurisdiction to ensure that the zone-specific rule subset contains only the relevant rules that are to be applied to the resource.

In operation 410, the data generation platform 104 can apply the zone-specific rule subset on the input data by executing one or more computer-executable commands (e.g., programmatic workflows). For example, the data generation platform 104 can generate the allocation metric value for each resource in the resource set and aggregate the one or more allocation metric values of the resource set to determine an overall allocation metric value. The data generation platform 104 can cause a computing device to dynamically perform one or more operations/transformations based on the input data and the rules using the commands. The operations/transformations can include summing transaction values, applying weightings, performing other mathematical operations defined by the rules, and so forth. In some implementations, the application of the zone-specific rule subset is based on a type of zone-specific parameter of the respective zone-specific parameter set, a priority level of one or more zones within the zone subset, and/or an access level of an entity associated with the entity identifier. For instance, rules associated with higher-priority zones may be applied first, or access levels may restrict the application of certain rules to specific entities. To generate the allocation metric value(s), the data generation platform 104 can obtain a reference data set comprising market data for the resources in the resource set. The data generation platform 104 can use the reference data set to generate the allocation metric value for each resource in the resource set.

The data generation platform 104 can apply the zone-specific rule subset on the input data synchronously through an online message queue channel (e.g., APACHE KAFKA, RABBITMQ). The data generation platform 104 can subscribe to the message queue, where input data messages are published. Each message contains the input data information, such as entity identifiers, resource identifiers, transaction data, and so forth. In some implementations, the data generation platform 104 can automatically deduct the overall allocation metric value from an entity account associated with the entity identifier of the input data and/or present, on the GUI, a representation indicative of the deducted overall allocation metric value. For example, the data generation platform 104 can be integrated with the entity's account management system and send a request to deduct the aggregate metric value. The request can include, for example, the entity identifier and the amount to be deducted.

The data generation platform 104 can receive, from the GUI, multiple input data sets, and apply the zone-specific rule subset on the multiple input data sets asynchronously based on one or more patterns associated with the corresponding entity identifiers of the multiple input data sets. The data generation platform 104 can generate a bulk response including respective overall allocation metric values for the multiple input data sets. For example, when multiple input data sets are submitted via the GUI, they are placed into the task queue. Each task in the queue represents a data set to be processed. The data generation platform 104 can continuously monitor the task queue and pick up tasks as they become available, thus enabling parallel processing of the data sets.

In some implementations, the overall allocation metric value is generated by a first machine learning (ML) model set trained to use corresponding allocation metric values across multiple resource sets to identify a distribution pattern set within corresponding entity identifiers of the multiple resource sets, corresponding resource identifiers of the multiple resource sets, and/or corresponding transaction data of the multiple resource sets. The first ML model set can be trained to generate a supplemental explanation of the generated overall allocation metric value describing the zone-specific rule subset.

In operation 412, the data generation platform 104 can display, on the GUI, a first representation (e.g., a graphical representation) indicative of the overall allocation metric value and/or a second representation (e.g., a graphical representation) indicative of the resource set. The data generation platform 104 can present, on the GUI, a graphical representation indicative of the supplemental explanation. The data generation platform 104 can receive, through a user interface, a proposed modification to a zone-specific parameter set. Responsive to receiving the proposed modification, the data generation platform 104 can transmit one or more computer commands defining a validation request indicative of the proposed modification to a validation agent. The data generation platform 104 can receive, from the validation agent, a response indicating that the proposed modification satisfies a predefined criteria set. Responsive to receiving the response, the data generation platform 104 can update the zone-specific parameter set in accordance with the proposed modification.

The user interface can dynamically determine display attributes of the graphical representation. For example, higher generated overall allocation metric values and/or their corresponding resources can be displayed differently from lower generated overall allocation metric values and/or their corresponding resources. Display attributes can include values associated with, for example, a color, a shape, a symbol, a pattern, an image, a set of text, a size, a font style, and/or an opacity level of the graphical representations. The display attributes can be dynamically determined by identifying a level of satisfaction of the overall allocation metric value with a set of predefined criteria (e.g., a particular threshold allocation metric value). Interactive elements such as buttons, sliders, checkboxes, and so forth enable users to customize the display attributes in real time or near real time. For example, tooltips and/or pop-up windows can display the proposed modification when users hover over or click on specific resources and/or allocation metric values.

In some implementations, the data generation platform 104 can generate, using a second ML model set, a modification set for the resource set to align the overall allocation metric value with a predefined threshold. The second ML model set can be trained to use the distribution pattern set and/or the overall allocation metric value of the resource set to output the modification set based on a corresponding confidence score of each modification in the modification set. The modification set can include specific changes to the allocation of resources, such as reassigning resources, adjusting transaction values, altering resource priorities, and so forth. The data generation platform 104 can present, on the GUI, a representation indicative of the modification set. The GUI can include, for example, the specific changes to be made, the expected impact on the overall allocation metric value, the confidence score for each modification, and so forth.

The data generation platform 104 can automatically execute one or more modifications in the modification set by generating and transmitting one or more computer-executable commands through communication channels associated with systems indicated by the modification. The communication channels can include APIs, web services, direct database connections, and so forth. After the modifications are executed, the data generation platform 104 can update the GUI to reflect the changes and generate an audit record for each modification, including a timestamp, the entity identifier, the resource identifier, and so forth. The data generation platform 104 can display, on the GUI, a representation indicating one or more of the modifications made, the updated overall allocation metric value, and so forth.

In some implementations, the data generation platform 104 can generate an audit record including a timestamp associated with the overall allocation metric value, the entity identifier, and/or the resource identifier. The data generation platform 104 can store the audit record in a database communicatively connected with the GUI. The database can be a relational database management system (RDBMS) that enables subsequent retrieval. For example, the data generation platform 104 uses an API or direct database connection to store the audit record. Users can query the database to retrieve specific audit records based on various criteria, such as date ranges, entity identifiers, resource identifiers, and so forth.

The data generation platform 104 can detect one or more failed operations associated with the application of the zone-specific rule subset on the input data. Responsive to detecting the one or more failed operations, the data generation platform 104 can transmit a computer-executable command set indicative of the one or more failed operations to one or more verification agents. The command set can include the specific rule or operation that failed, the input data that caused the failure, and/or any error messages or stack traces generated by the system. Verification agents can include, for example, administrators, users, another AI model, and so forth.

Example Implementation of the Models of the Data Generation Platform

Figure 5:
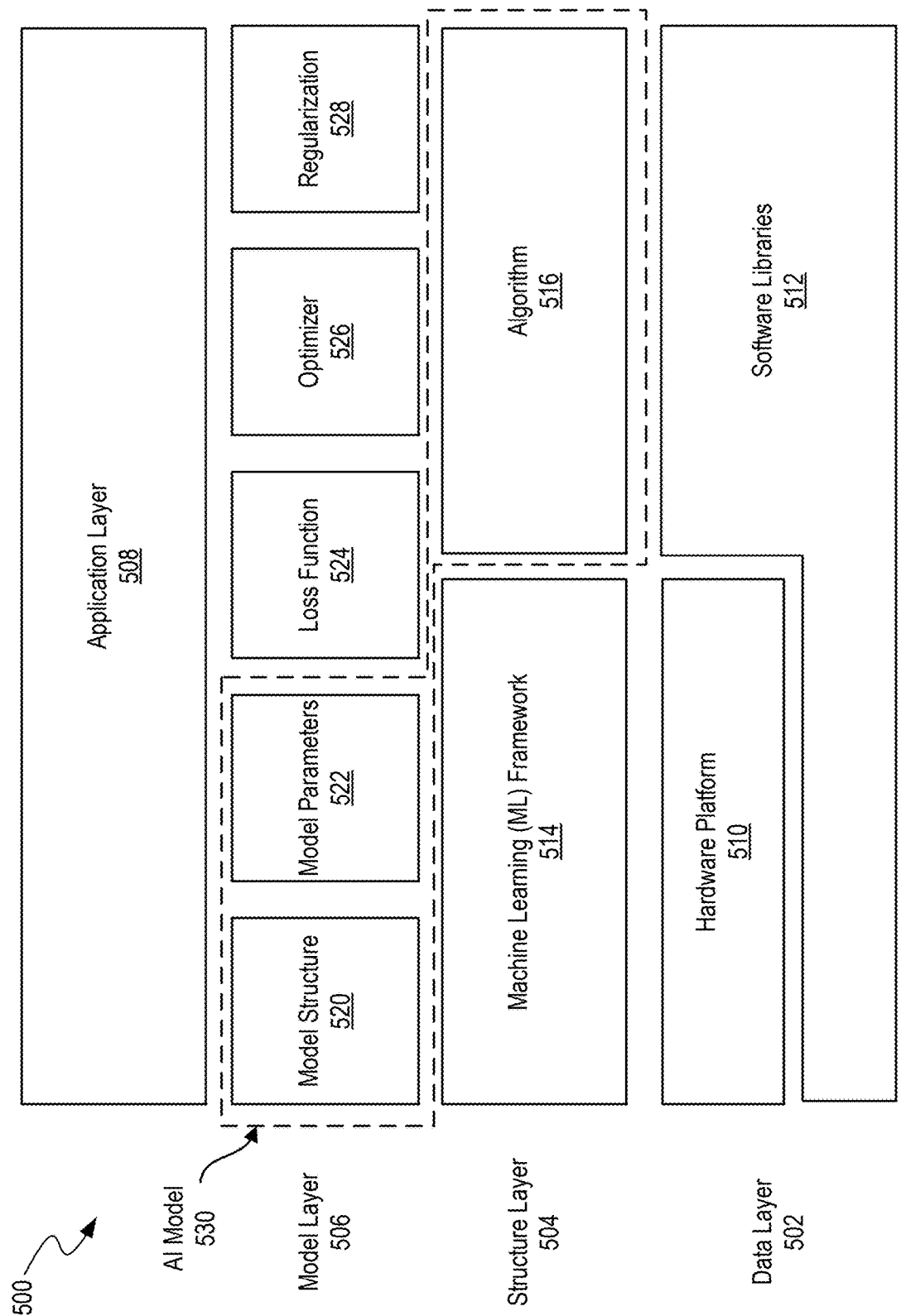
FIG. 5 illustrates a layered architecture of an artificial intelligence (AI) system that can implement the machine learning models of a data generation platform, in accordance with some implementations of the present technology.

FIG. 5 illustrates a layered architecture of an AI system 500 that can implement the ML models of the data generation platform 104 of FIG. 1, in accordance with some implementations of the present technology. Example ML models can include the models executed by the data generation platform 104, such as rule application engine 108. Accordingly, the rule application engine 108 can include one or more components of the AI system 500.

As shown, the AI system 500 can include a set of layers, which conceptually organize elements within an example network topology for the AI system's architecture to implement a particular AI model. Generally, an AI model is a computer-executable program implemented by the AI system 500 that analyses data to make predictions. Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking, such as the resources described in relation to FIGS. 6 and 6. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, enabling them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that enables users to build and deploy the AI model. The ML framework 514 can include an open-source library, an API, a gradient-boosting library, an ensemble method, and/or a deep learning toolkit that work with the layers of the AI system facilitate development of the AI model. For example, the ML framework 514 can distribute processes for application or training of the AI model across multiple resources in the hardware platform 510. The ML framework 514 can also include a set of pre-built components that have the functionality to implement and train the AI model and enable users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that enables the computing resources to learn from new input data and create new/modified outputs based on what was learned. In some implementations, the algorithm 516 can build the AI model through being trained while running computing resources of the hardware platform 510. This training enables the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of input data 102 in FIG. 1) from various source computing systems described in relation to FIG. 1. Furthermore, training data can include pre-processed data generated by various engines of the data generation platform 104 described in relation to FIG. 1. The user may label the training data based on one or more classes and trains the AI model by inputting the training data to the algorithm 516. The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can include classification and/or regression. Classification techniques include teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format. The data generation platform 104 can use unsupervised learning to identify patterns in claim history (e.g., to identify particular event sequences) and so forth. In some implementations, performance of the data generation platform 104 that can use unsupervised learning is improved because the incoming input data 102 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can include a front-end user interface of the data generation platform 104.

Example Computing Environment of the Data Generation Platform

Figure 6:
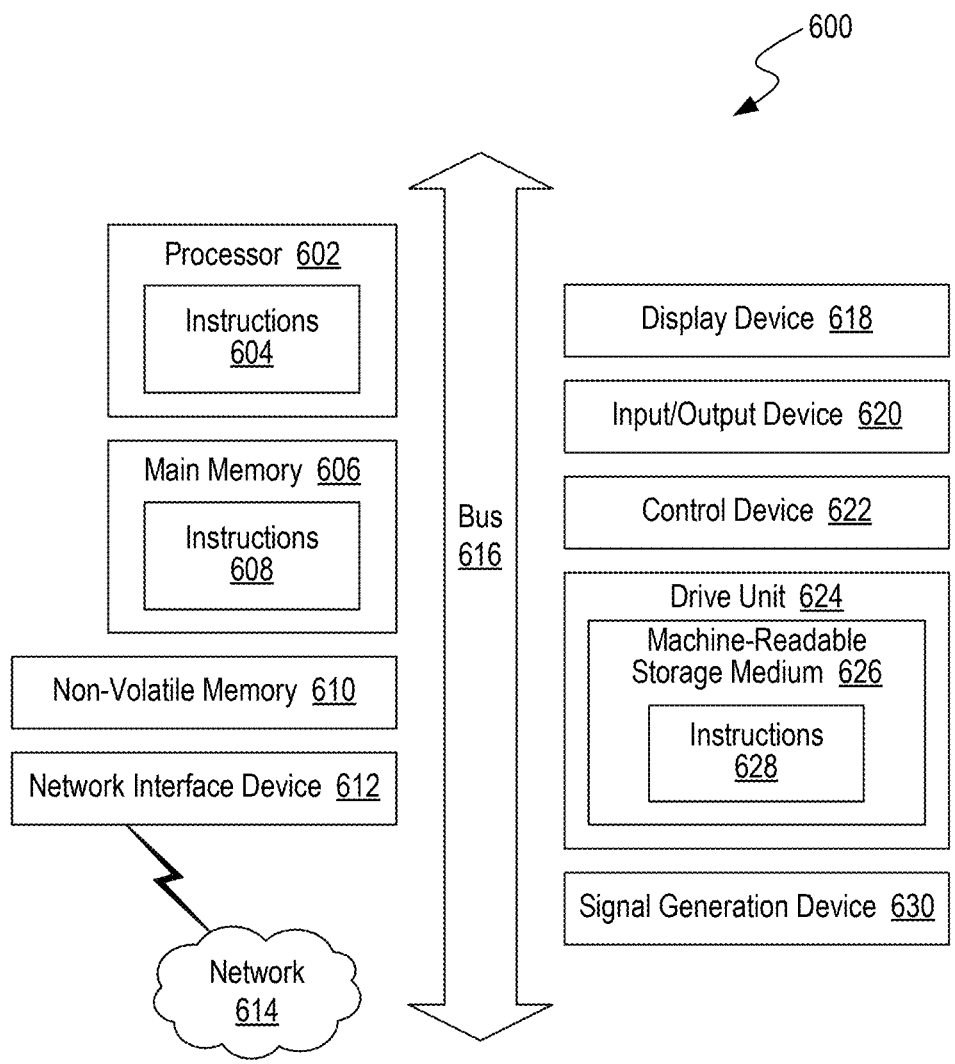
FIG. 6 is a block diagram showing some of the components typically incorporated in at least some of the computer systems and other devices on which the data generation platform operates in accordance with some implementations of the present technology.

FIG. 6 is a block diagram showing some of the components typically incorporated in at least some of the computer systems and other devices 600 on which the disclosed system operates in accordance with some implementations of the present technology. As shown, an example computer system 600 can include: one or more processors 602, main memory 608, non-volatile memory 612, a network interface device 614, video display device 620, an input/output device 622, a control device 624 (e.g., keyboard and pointing device), a drive unit 626 that includes a machine-readable medium 628, and a signal generation device 632 that are communicatively connected to a bus 618. The bus 618 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real time, near real time, or in batch mode.

The network interface device 614 enables the computer system 600 to exchange data in a network 616 with an entity that is external to the computing system 600 through any communication protocol supported by the computer system 600 and the external entity. Examples of the network interface device 614 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 608, non-volatile memory 612, machine-readable medium 628) can be local, remote, or distributed. Although shown as a single medium, the machine-readable medium 628 can include multiple media (e.g., a centralized/distributed database and/or associated caches and servers) that store one or more sets of instructions 630. The machine-readable (storage) medium 628 can include any medium that is capable of storing, encoding, or carrying a set of instructions for execution by the computer system 600. The machine-readable medium 628 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 610, 630) set at various times in various memory and storage devices in computing device(s). When read and executed by the processor 602, the instruction(s) cause the computer system 600 to perform operations to execute elements involving the various aspects of the disclosure.

Figure 7:
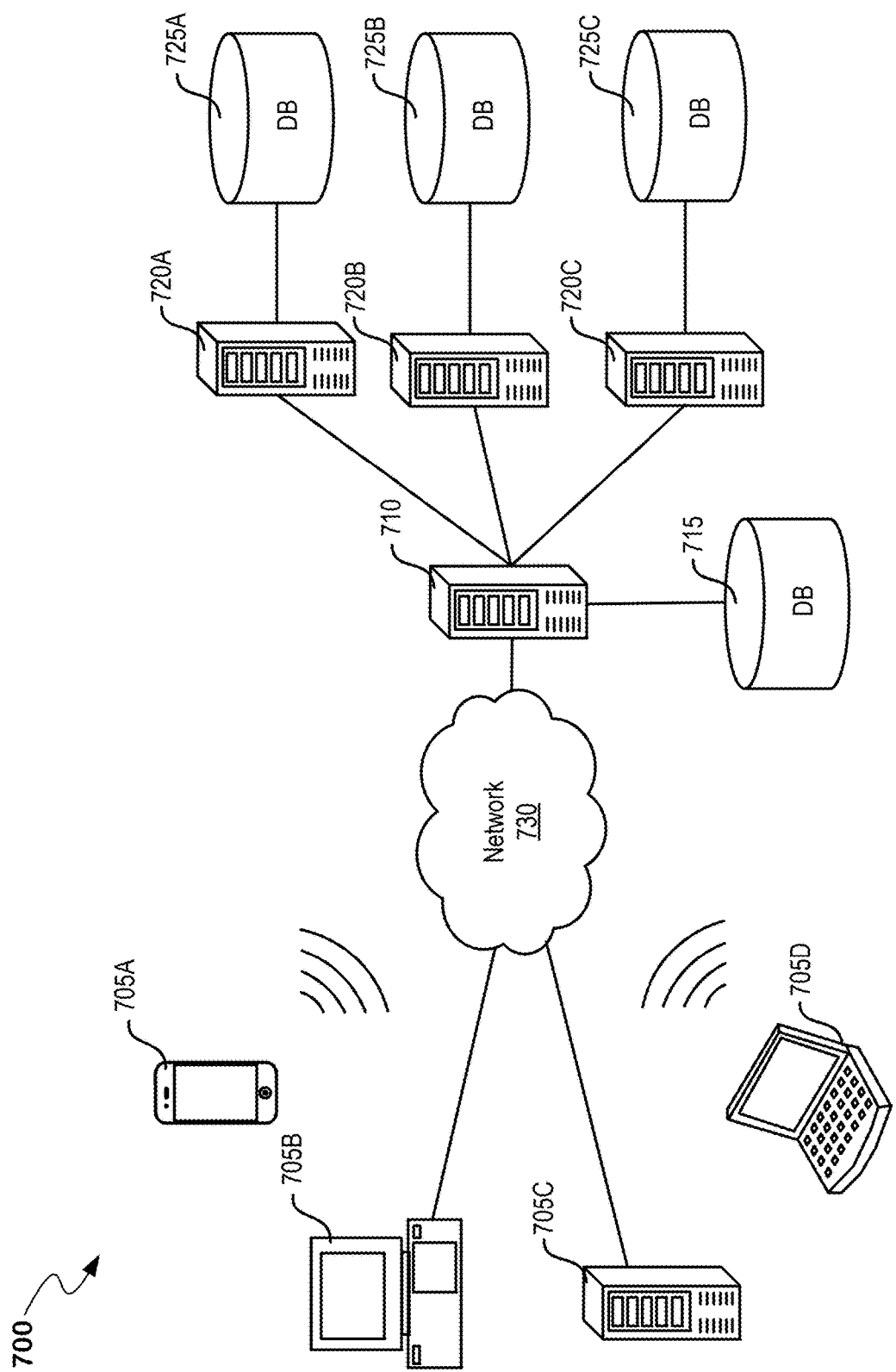
FIG. 7 is a system diagram illustrating an example of a computing environment in which the data generation platform operates in some implementations of the present technology.

FIG. 7 is a system diagram illustrating an example of a computing environment in which the disclosed system operates in some implementations. In some implementations, environment 700 includes one or more client computing devices 705A-D, examples of which can host the data generation platform 104 of FIG. 1. Client computing devices 705 operate in a networked environment using logical connections through network 730 to one or more remote computers, such as a server computing device.

In some implementations, server 710 is an edge server which receives client requests and coordinates fulfillment of those requests through other servers, such as servers 720A-C. In some implementations, server computing devices 710 and 720 comprise computing systems, such as the data generation platform 104 of FIG. 1. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server or client devices. In some implementations, servers (710, 720A-C) connect to a corresponding database (715, 725A-C). As discussed above, each server 720 can correspond to a group of servers, and each of these servers can share a database or can have its own database. Databases 715 and 725 warehouse (e.g., store) information such as claims data, email data, call transcripts, call logs, policy data and so on. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. In some implementations, network 730 is the Internet or some other public or private network. Client computing devices 705 are connected to network 730 through a network interface, such as by wired or wireless communication. While the connections between server 710 and servers 720 are shown as separate connections, these connections can be any kind of local, wide area, wired, or wireless network, including network 730 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

I claim:

1. A system for automatically applying distributed parameters, the system comprising:
at least one hardware processor; and
at least one non-transitory memory storing instructions, which, when executed by the at least one hardware processor, cause the system to:
obtain an aggregate rule set comprising (1) a respective zone-specific parameter set for each zone of multiple zones and (2) a respective zone classifier common to each zone-specific parameter of the respective zone-specific parameter set,
wherein the aggregate rule set is configured to determine, for each zone of the multiple zones, an allocation metric value associated with a transaction value of one or more resources;
receive, from a graphical user interface (GUI), input data comprising (1) an entity identifier, (2) a resource identifier representing each resource in a resource set, and (3) transaction data indicative of a corresponding transaction value for each resource in the resource set,
wherein the input data is indicative of a particular zone classifier for each resource in the resource set;
responsive to receiving the input data, map the received input data to one or more zones of the multiple zones by comparing the particular zone classifier for each resource in the resource set with the respective zone classifier for each zone-specific parameter set of the aggregate rule set;
using the mapped one or more zones, filter the aggregate rule set to generate a zone-specific rule subset comprising one or more zone-specific parameter sets associated with the particular zone classifier;
apply the zone-specific rule subset on the input data by executing one or more computer-executable commands configured to:
generate the allocation metric value for each resource in the resource set, and
aggregate the one or more allocation metric values of the resource set to determine an overall allocation metric value; and
display, on the GUI, (1) a first representation indicative of the overall allocation metric value, and (2) a second representation indicative of the resource set.

2. The system of claim 1, wherein the overall allocation metric value is generated by a first machine learning (ML) model set trained to use corresponding allocation metric values across multiple resource sets to identify a distribution pattern set within one or more of: (1) corresponding entity identifiers of the multiple resource sets, (2) corresponding resource identifiers of the multiple resource sets, or (3) corresponding transaction data of the multiple resource sets.

3. The system of claim 2, wherein the system is further configured to:
generate, using a second ML model set, a modification set for the resource set configured to align the overall allocation metric value with a predefined threshold,
wherein the second ML model set is trained to use (1) the distribution pattern set and (2) the overall allocation metric value of the resource set to output the modification set based on a corresponding confidence score of each modification in the modification set; and
present, on the GUI, a third representation indicative of the modification set.

4. The system of claim 2,
wherein the first ML model set is further trained to generate a supplemental explanation of the generated overall allocation metric value describing the zone-specific rule subset, and
wherein the system is further configured to present, on the GUI, a third representation indicative of the supplemental explanation.

5. The system of claim 1, wherein the system is further configured to:
apply the zone-specific rule subset on the input data synchronously through an online message queue channel;
automatically deduct the overall allocation metric value from an entity account associated with the entity identifier of the input data; and
present, on the GUI, a third representation indicative of the deducted overall allocation metric value.

6. The system of claim 1, wherein the system is further configured to:
receive, from the GUI, multiple input data sets;
apply the zone-specific rule subset on the multiple input data sets asynchronously based on one or more patterns associated with the corresponding entity identifiers of the multiple input data sets; and
generate a bulk response including respective overall allocation metric values for the multiple input data sets.

7. A non-transitory, computer-readable storage medium comprising instructions thereon, wherein the instructions, when executed by at least one data processor of a system, cause the system to:
obtain an aggregate rule set comprising (1) a respective zone-specific parameter set for each zone of a zone set and (2) a respective zone classifier common to each zone-specific parameter of the respective zone-specific parameter set,
wherein the aggregate rule set is configured to determine, for each zone of the zone set, an allocation metric value associated with one or more resources;
receive input data comprising (1) an entity identifier, (2) a resource identifier representing each resource in a resource set, and (3) operational data associated with each resource in the resource set,
wherein the input data is indicative of a particular zone classifier for each resource in the resource set;
responsive to receiving the input data, link the received input data with one or more zones of the zone set by comparing the particular zone classifier for each resource in the resource set with the respective zone classifier for each zone-specific parameter set of the aggregate rule set;
using the linked one or more zones, filter the aggregate rule set to generate a zone-specific rule subset comprising one or more zone-specific parameter sets associated with the particular zone classifier; and
apply the zone-specific rule subset on the input data by executing one or more computer-executable commands configured to:
generate the allocation metric value for each resource in the resource set, and
aggregate the one or more allocation metric values of the resource set to determine an overall allocation metric value.

8. The non-transitory, computer-readable storage medium of claim 7, wherein the instructions further cause the system to:

obtain a reference data set comprising market data for the resources in the resource set; and use the reference data set to generate the allocation metric value for each resource in the resource set.

9. The non-transitory, computer-readable storage medium of claim 7, wherein the instructions further cause the system to:

receive, through a user interface, a proposed modification to a particular zone-specific parameter set within the aggregate rule set;

responsive to receiving the proposed modification, transmit one or more computer commands defining a validation request indicative of the proposed modification to a validation agent;

receive, from the validation agent, a response indicating that the proposed modification satisfies a predefined criteria set; and responsive to receiving the response, update the particular zone-specific parameter set in accordance with the proposed modification.

10. The non-transitory, computer-readable storage medium of claim 7, wherein the input data is received via a user interface, wherein the instructions further cause the system to:

generate an audit record including one or more of: a timestamp associated with the overall allocation metric value, the entity identifier, or the resource identifier; and store the audit record in a database communicatively connected with the user interface.

11. The non-transitory, computer-readable storage medium of claim 7, wherein the instructions further cause the system to:

display, on a graphical user interface (GUI), (1) a first representation indicative of the overall allocation metric value, and (2) a second representation indicative of the resource set, wherein the first and second representation are rendered in accordance with a set of display attributes, wherein the set of display attributes include one or more of: a color, a shape, a symbol, a pattern, an image, a set of text, a size, a font style, or an opacity level of the first and second representation, and wherein the set of display attributes are dynamically determined by identifying a level of satisfaction of the overall allocation metric value with a set of predefined criteria.

12. The non-transitory, computer-readable storage medium of claim 11, wherein the instructions further cause the system to:

generate, using an ML model set, a modification set for the resource set configured to align the overall allocation metric value with a predefined threshold, wherein the ML model set is trained to use (1) la distribution pattern set and (2) the overall allocation metric value of the resource set to output the modification set based on a corresponding confidence score of each modification in the modification set; and present, on a user interface, a representation indicative of the modification set.

13. The non-transitory, computer-readable storage medium of claim 12, wherein the ML model set is further trained to generate a supplemental explanation of the generated overall allocation metric value describing the zone-specific rule subset, and wherein the instructions further cause the system to present, on the all user interface, a representation indicative of the supplemental explanation.

14. A computer-implemented method for automatically applying distributed parameters, the computer-implemented method comprising:

obtaining an aggregate rule set comprising (1) a respective zone-specific parameter set for one or more zones of a zone set and (2) a respective zone classifier common to one or more zone-specific parameters of the respective zone-specific parameter set, wherein the aggregate rule set is configured to determine, for the one or more zones of the zone set, an allocation metric value associated with one or more resources;

receiving input data comprising (1) an entity identifier, (2) a resource identifier representing one or more resources in a resource set, and (3) operational data associated with the one or more resources in the resource set, wherein the input data is indicative of a particular zone classifier for the one or more resources in the resource set;

responsive to receiving the input data, linking the received input data with a zone subset of the zone set by comparing the particular zone classifier for the one or more resources in the resource set with the respective zone classifier for the one or more zone-specific parameter sets of the aggregate rule set;

using the linked zone subset, filtering the aggregate rule set to generate a zone-specific rule subset comprising one or more zone-specific parameter sets associated with the particular zone classifier; and applying the zone-specific rule subset on the input data by executing one or more computer-executable commands configured to generate an overall allocation metric value for the resource set.

15. The computer-implemented method of claim 14, wherein the application of the zone-specific rule subset is based on one or more of:

a type of zone-specific parameter of the respective zone-specific parameter set, a priority level of one or more zones within the zone subset, or an access level of an entity associated with the entity identifier.

16. The computer-implemented method of claim 14, further comprising:

receiving a raw reference data set comprising market data associated with the resource set; and converting the raw reference data set into a standardized reference data set sharing a common format.

17. The computer-implemented method of claim 14, further comprising:

detecting one or more failed operations associated with the application of the zone-specific rule subset on the input data; and responsive to detecting the one or more failed operations, transmitting a computer-executable command set indicative of the one or more failed operations to one or more verification agents.

18. The computer-implemented method of claim 14, wherein the overall allocation metric value is generated by a first machine learning (ML) model set trained to use corresponding allocation metric values across multiple resource sets to identify a distribution pattern set within one or more of: (1) corresponding entity identifiers of the multiple resource sets, (2) corresponding resource identifiers of the multiple resource sets, or (3) corresponding transaction data of the multiple resource sets.

19. The computer-implemented method of claim 18, further comprising:
generate, using a second ML model set, a modification set for the resource set configured to align the overall allocation metric value with a predefined threshold,
wherein the second ML model set is trained to use (1) the distribution pattern set and (2) the overall allocation metric value of the resource set to output the modification set based on a corresponding confidence score of each modification in the modification set; and
present, on a graphical user interface, a representation indicative of the modification set.

20. The computer-implemented method of claim 18, wherein the first ML model set is further trained to generate a supplemental explanation of the generated overall allocation metric value describing the zone-specific rule subset, and further comprising:
presenting, on a graphical user interface, a representation indicative of the supplemental explanation.

* * * * *